(12) United States Patent
Shaw (10) Patent No.: US 10,821,511 B2
(45) Date of Patent: Nov. 3, 2020

(54) ADDITIVE MANUFACTURING APPARATUS AND METHOD FOR LARGE COMPONENTS

(71) Applicant: General Electric Company, Schenectady, NY (US)

(72) Inventor: Mark Richard Shaw, Mason, OH (US)

(73) Assignee: General Electric Company, Schenectady, NY (US)

(*) Notice: Subject to any disclaimer, the term of this patent is extended or adjusted under 35 U.S.C. 154(b) by 910 days.

(21) Appl. No.: 15/288,487

(22) Filed: Oct. 7, 2016

(65) Prior Publication Data

US 2018/0099332 A1 Apr. 12, 2018

(51) Int. Cl.
*B22F 3/105* (2006.01)
*B22F 3/00* (2006.01)
*B33Y 10/00* (2015.01)
*B33Y 30/00* (2015.01)

(52) U.S. Cl.
CPC ............ *B22F 3/1055* (2013.01); *B22F 3/003* (2013.01); *B33Y 10/00* (2014.12); *B33Y 30/00* (2014.12); *B22F 2003/1056* (2013.01); *Y02P 10/25* (2015.11)

(58) Field of Classification Search
CPC .............................. B29C 64/153; B33Y 10/00
See application file for complete search history.

(56) References Cited

U.S. PATENT DOCUMENTS

| 5,354,414 A | 10/1994 | Feygin |
| 2006/0108712 A1 | 5/2006 | Mattes |
| 2010/0283188 A1 | 11/2010 | Rohner et al. |
| 2014/0191439 A1 | 7/2014 | Davis |
| 2014/0263209 A1 | 9/2014 | Burris et al. |
| 2015/0017271 A1 | 1/2015 | Donaldson et al. |
| 2016/0368050 A1* | 12/2016 | Morris ............... B23K 15/0086 |

OTHER PUBLICATIONS

European Search Report and Opinion issued in connection with related EP Application No. 16174242.4 dated Nov. 4, 2016.

* cited by examiner

*Primary Examiner* — Colleen P Dunn
*Assistant Examiner* — Jeremy C Jones
(74) *Attorney, Agent, or Firm* — General Electric; Brian Overbeck (57) ABSTRACT

An additive manufacturing apparatus includes: first and second spaced apart side walls extending along a pre-defined path and defining a build chamber therebetween; one or more build units mounted for movement along the pre-defined path, the one or more build units collectively including: a powder dispenser positioned above the build chamber; an applicator configured to scrape powder dispensed into the build chamber; and a directed energy source configured to fuse the scraped powder; a moveable build platform disposed between the first and second spaced-apart side walls; and an actuator assembly connected to the build platform, the actuator assembly being configured to rotate and move the build platform continuously along a build axis to provide a spiral movement and permit a part to be built continuously in a spiral configuration.

11 Claims, 11 Drawing Sheets

ADDITIVE MANUFACTURING APPARATUS AND METHOD FOR LARGE COMPONENTS

BACKGROUND OF THE INVENTION

This invention relates generally to an additive manufacturing apparatus and more particularly to an apparatus for large components.

"Additive manufacturing" is a term used herein to describe a process which involves layer-by-layer construction or additive fabrication (as opposed to material removal as with conventional machining processes). Such processes may also be referred to as "rapid manufacturing processes". Additive manufacturing processes include, but are not limited to: Direct Metal Laser Melting (DMLM), Laser Net Shape Manufacturing (LNSM), electron beam sintering, Selective Laser Sintering (SLS), 3D printing, such as by inkjets and laserjets, Stereolithography (SLA), Electron Beam Melting (EBM), Laser Engineered Net Shaping (LENS), and Direct Metal Deposition (DMD).

Currently, powder bed technologies have demonstrated the best resolution capabilities of prior art metal additive manufacturing technologies. However, since the build needs to take place in the powder bed, conventional machines use a large amount of powder, for example a powder load can be over 130 kg (300 lbs.). This is costly when considering a factory environment using many machines. The powder that is not directly melted into the part but stored in the neighboring powder bed is problematic because it adds weight to the elevator systems, complicates seals and chamber pressure problems, is detrimental to part retrieval at the end of the part build, and becomes unmanageable in large bed systems currently being considered for large components.

Accordingly, there remains a need for an additive manufacturing apparatus and method that can produce large parts.

BRIEF SUMMARY OF THE INVENTION

This need is addressed by the technology described herein, which provides apparatus and method for manufacturing parts by using one or more build units movable along a path over a build chamber.

According to one aspect of the technology described herein, an additive manufacturing apparatus includes: first and second spaced apart side walls extending along a pre-defined path and defining a build chamber therebetween; one or more build units mounted for movement along the pre-defined path, the one or more build units collectively including: a powder dispenser positioned above the build chamber; an applicator configured to scrape powder dispensed into the build chamber; and a directed energy source configured to fuse the scraped powder; a moveable build platform disposed between the first and second spaced-apart side walls; and an actuator assembly connected to the build platform, the actuator assembly being configured to rotate and move the build platform continuously along a build axis to provide a spiral movement and permit a part to be built continuously in a spiral configuration.

According to another aspect of the technology described herein, an additive manufacturing method includes: positioning one or more build units over a build chamber defined by first and second spaced-apart side walls which extend along a pre-defined path; moving the build chamber to define a spiral movement by rotating the build chamber about an axis while simultaneously translating the build chamber along the axis; while moving the build chamber: using the one or more build units to deposit powder into the build chamber; using the one or more build units to direct a beam from a directed energy source to fuse the powder; and continuing the steps of depositing, directing, and moving to build up a part in a spiral fashion until the part is complete.

According to another aspect of the technology described herein, an additive manufacturing apparatus includes: first and second spaced apart side walls extending along a pre-defined path and defining a build chamber therebetween; one or more housings, each of the housings including two or more spaced-apart build units, each build unit having a directed energy source configured to fuse powder contained in the build chamber; a moveable build platform disposed between the first and second spaced-apart side walls; and an actuator assembly connected to the build platform, the actuator assembly being configured to rotate and move the build platform continuously along a build axis to provide a spiral movement and permit a part to be built continuously in a spiral configuration

BRIEF DESCRIPTION OF THE DRAWINGS

The invention may be best understood by reference to the following description taken in conjunction with the accompanying drawing figures, in which.

DETAILED DESCRIPTION OF THE INVENTION

Figure 1:
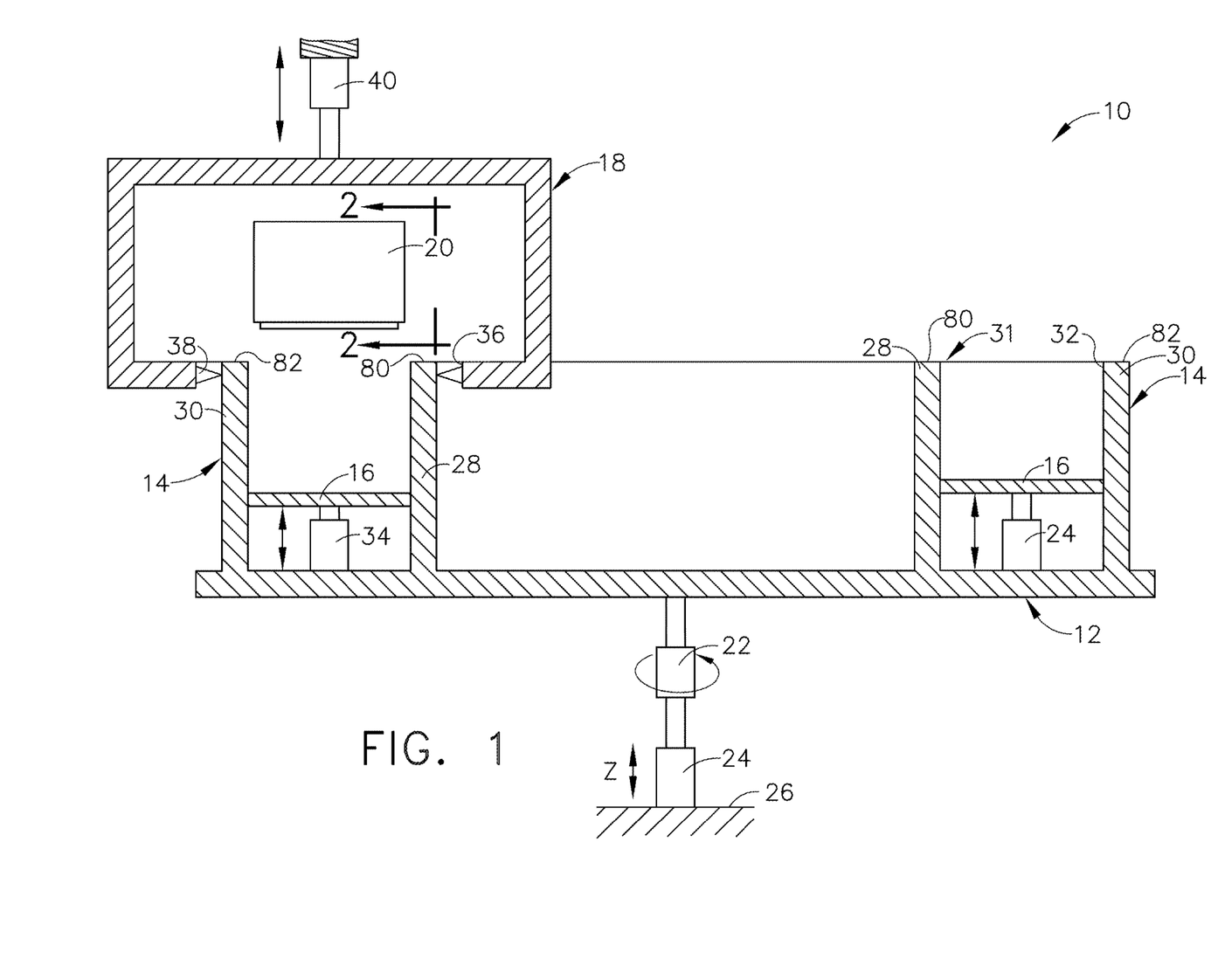
FIG. 1 is a cross-sectional view of an exemplary additive manufacturing apparatus.
Figure 2:
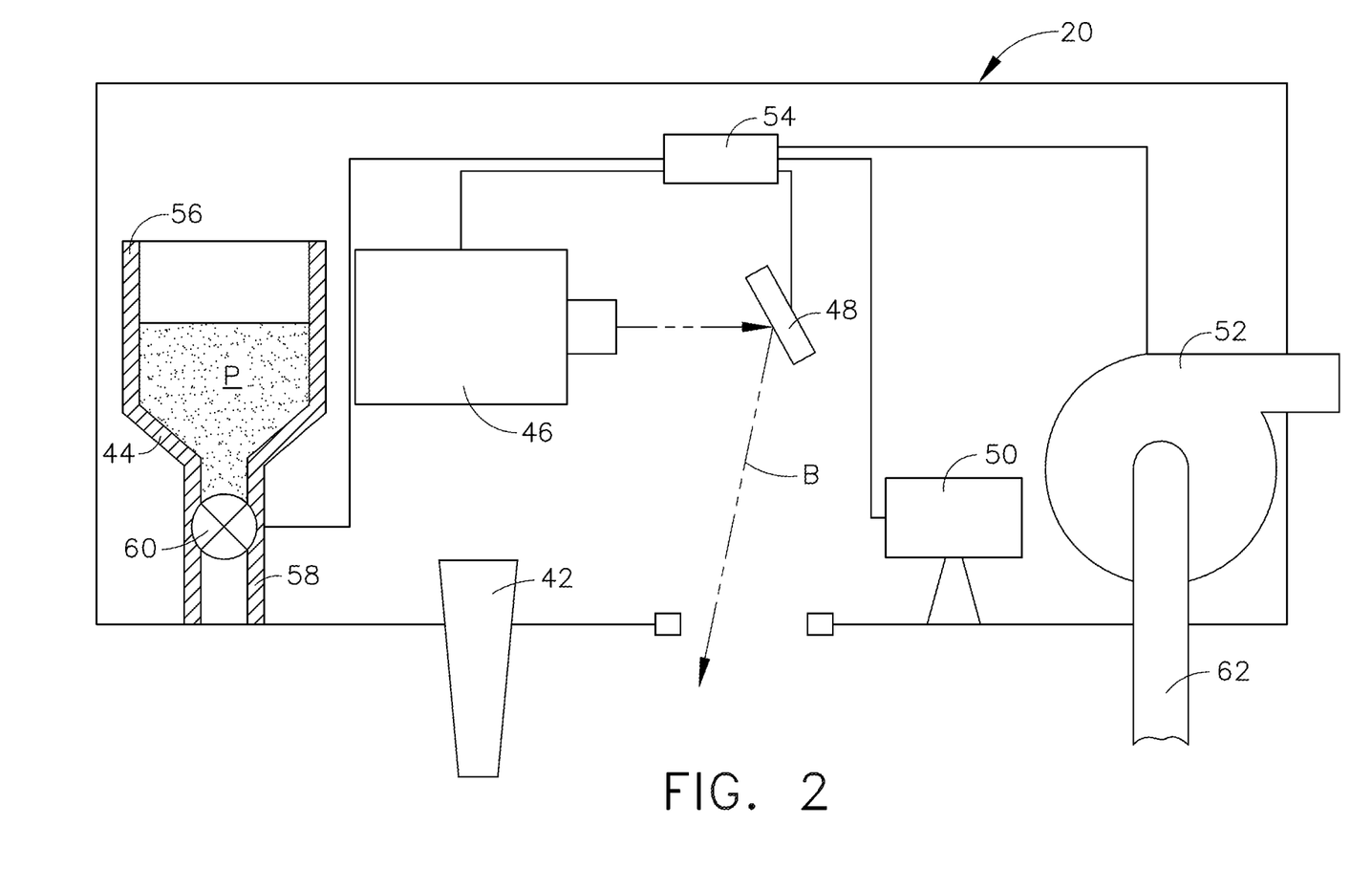
FIG. 2 is a schematic sectional view of a fusing unit of FIG. 1.

Referring to the drawings wherein identical reference numerals denote the same elements throughout the various views, FIGS. 1 and 2 illustrate an exemplary additive manufacturing apparatus 10 constructed according to the technology described herein. The basic components are a turntable 12, a build chamber 14 surrounding a build platform 16, a housing 18, and a fusing unit 20 disposed in the housing 18. Each of these components will be described in more detail below.

The turntable 12 is a rigid structure configured to move vertically (i.e. parallel to a z-axis) as well as rotate 360°. As illustrated, the turntable 12 is secured to an end mount of a motor 22 that is operable to selectively rotate the turntable 12 and the motor 22 is secured to an end mount of an actuator 24 that is operable to selectively move the turntable 12 vertically up or down. The actuator 24 is secured to a stationary support structure 26. The actuator 24 is depicted schematically in FIG. 1. Whenever the term "actuator" is used herein, it will be understood that devices such as pneumatic or hydraulic cylinders, ballscrew or linear actuators, and so forth, may be used for this purpose. The motor 22 is depicted schematically in FIG. 1, with the understanding that any device that will produce controlled rotary motion may be used for this purpose.

Figure 3:
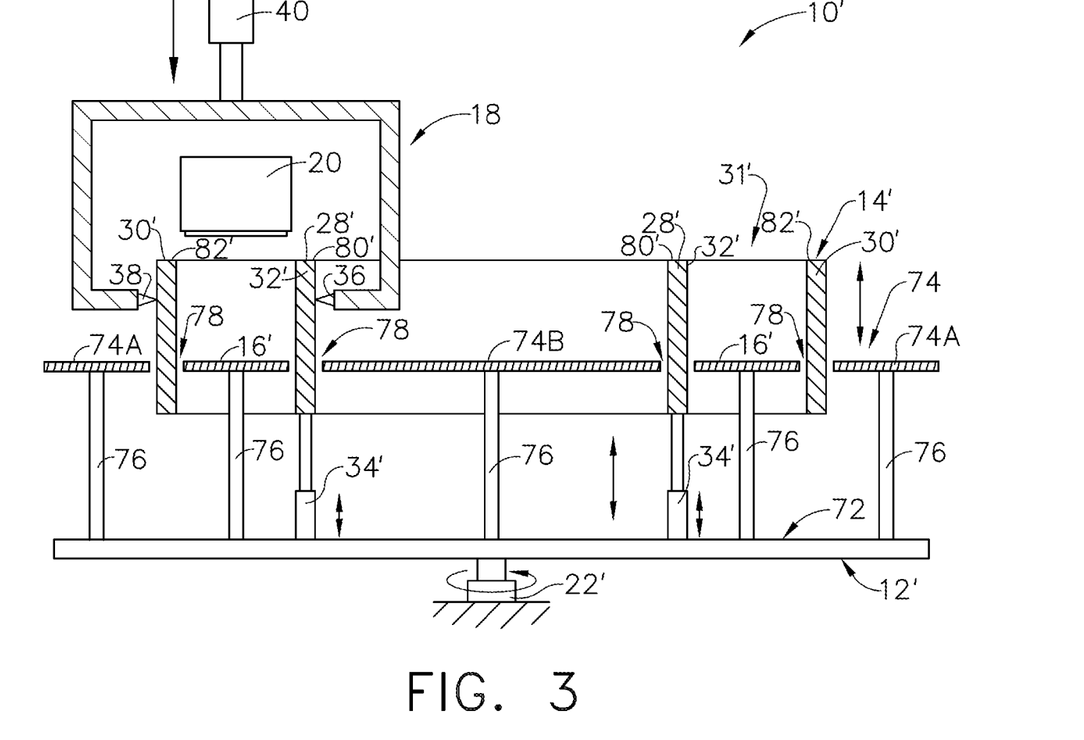
FIG. 3 is a cross-sectional view of an alternative additive manufacturing apparatus.
Figure 5:
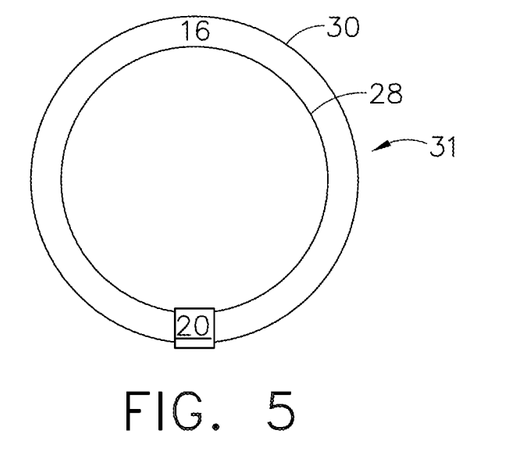
FIG. 5 is a schematic top plan view of the apparatus of FIG. 1.
Figure 6:
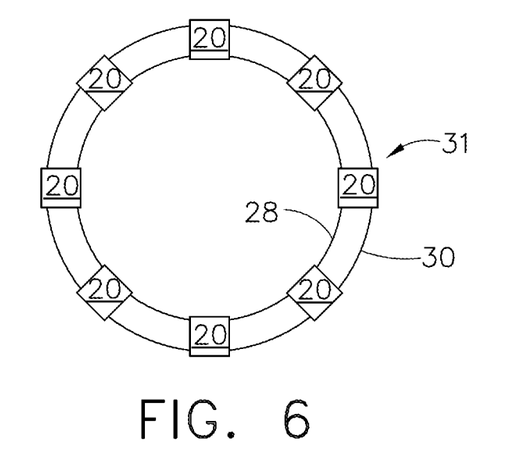
FIG. 6 is a top plan view of an alternative arrangement of the apparatus of FIG. 1.

The build chamber 14 includes inner and outer side walls 28 and 30 that define a build chamber opening 32. As illustrated, the inner and outer side walls 28 and 30 extend perpendicularly upward from the turntable 12 to define a path in the form of a ring 31, see FIG. 5, to allow continuous manufacturing and may be integrally formed with the turntable 12. Alternatively, as shown in FIG. 3, the ring may be separated from the turntable. It should be appreciated that the inner and outer side walls 28 and 30 may extend upwardly from the turntable 12 at angles other than ninety degrees. As depicted in FIGS. 5 and 6, the inner and outer side walls 28 and 30 define a path in the form of ring 31; however, it should be appreciated that the inner and outer side walls 28 and 30 may define paths in other forms such as straight lines, curves and or polygons to permit the manufacture of various shaped parts.

The build platform 16 is a plate-like structure that is vertically slidable in the build chamber 14 below build chamber opening 32. The build platform 16 extends an entire length of the build chamber 14 and is secured to an end mount of one or more actuators 34 that are operable to selectively move the build platform 16 up or down as the turntable 12 rotates. The actuators 34 are depicted schematically in FIG. 1.

The housing 18 includes an opening 36 configured to receive at least a portion of the build chamber 14 therein and to permit the fusing unit 20 to build a part. A seal 38 is disposed around the opening 36 to provide sealing engagement between the opening 36 and the inner and outer side walls 28 and 30 of the build chamber 14. The seal 38 prevents contaminants from interfering with the build process, centers the housing 18 with the build chamber 14, and permits the housing 18 to slide along the inner and outer side walls 28 and 30 as the turntable 12 rotates with minimal interference. The housing 18 is secured to an end mount of an actuator 40 that is operable to selectively move the housing 18 up or down during a build process to maintain a pre-determined distance between the fusing unit 20 and a part being built. The actuator 40 also allows the housing to be removed from engagement with the inner and outer side walls 28 and 30. The actuator 40 is depicted schematically in FIG. 1.

As illustrated in FIG. 2, the fusing unit 20, includes an applicator 42, a powder dispenser 44, a directed energy source 46, a beam steering apparatus 48, an imaging device 50, a vacuum pump 52, and a controller 54. The fusing unit 20 is one example of a "build unit" which refers generally to any unit positioned over the build chamber 14 and configured to perform one or more steps of an additive build process. Other types of build units are described below.

Figure 7:
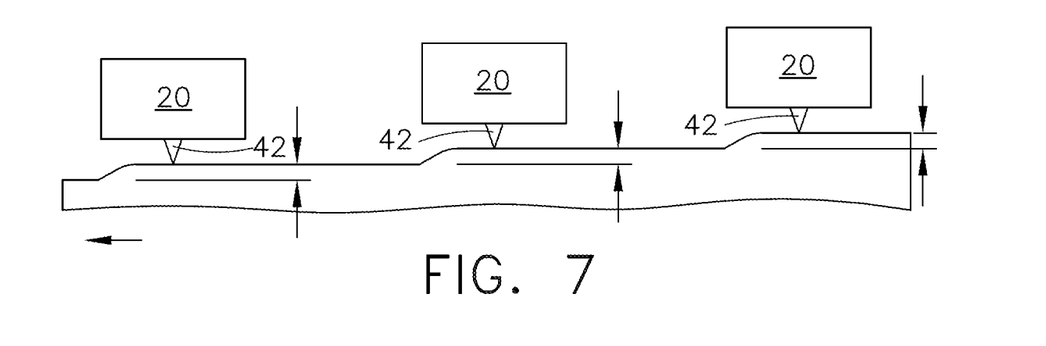
FIG. 7 is a schematic side view of the operation of the apparatus of FIG. 6.

The applicator 42 is a rigid, laterally-elongated structure that, when used, scrapes along at a fixed distance above the build platform 16 to provide a layer increment of powder thereon between inner and outer side walls 28 and 30, see FIG. 7.

The powder dispenser 44 comprises a supply container 56 in the form of a hopper having a spout 58 for dropping powder P onto the build platform 16. A metering valve 60 is positioned in the spout 58. In use, the metering valve 60 is used to control the deposition rate of powder P based on multiple factors such as the size of the build platform 16, a desired layer increment thickness, and the relative speed between the build platform 16 and the fusing unit 20.

The directed energy source 46 may comprise any known device operable to generate a beam of suitable power and other operating characteristics to melt and fuse the powder during the build process, described in more detail below. For example, the directed energy source 46 may be a laser. Other directed-energy sources such as electron beam guns are suitable alternatives to a laser.

The beam steering apparatus 48 comprises one or more mirrors, prisms, and/or lenses and provided with suitable actuators, and arranged so that a beam "B" from the directed energy source 46 can be focused to a desired spot size and steered to a desired position in an X-Y plane coincident with the build platform 16.

The vacuum pump 52 includes a nozzle 62 configured to extend into the build chamber 14. The vacuum pump 52 may be used to remove excess powder after the applicator 42 has leveled powder and before fusing takes place.

The imaging device 50 may be any apparatus that provides a signal or data indicative of the surface condition within the build chamber 14, such as camera or other sensor operating in the visible, IR, and/or UV spectrum. The imaging device 50 allows a user to monitor the build process and modify the operating parameters of the fusing unit 20 and/or shut the build process down when the user detects a defect or malfunction in the build process. The imaging device 50 may also be connected to the controller 54 to provide an automated quality control process. The controller 54 controls the directed energy source 46, the beam steering apparatus 48, the powder dispenser 44, and the vacuum pump 52 of the fusing unit 20. The imaging device 50 provides the controller 54 with signals representative of the condition of the build process. For example, the controller 54 may use data from the imaging device 50 to control powder flow rate and/or to stop the build process upon detection of a defect.

Figure 4:
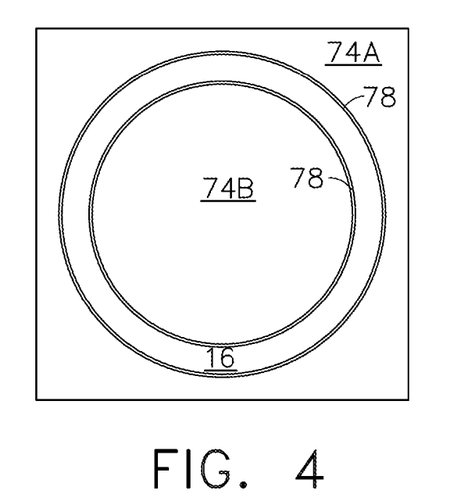
FIG. 4 is a top plan view of the apparatus of FIG. 3.

FIGS. 3 and 4 illustrate another configuration of additive manufacturing apparatus 10 and is shown at reference numeral 10'. Like apparatus 10, apparatus 10' uses the housing 18 and fusing unit 20 described above. It should also be appreciated that the apparatus 10' may use separate laser and powder units like that described below with reference to additive manufacturing apparatus 100. Like apparatus 10, apparatus 10' includes a turntable 12' and a build chamber 14' surrounding a build platform 16'. Each of these components will be described in more detail below.

The turntable 12' is a rigid structure configured to rotate 360°. As illustrated, the turntable 12' is secured to an end mount of a motor 22' that is operable to selectively rotate the turntable 12'. The motor 22' is depicted schematically in FIG. 3.

The turntable 12' includes spaced-apart lower and upper platforms 72 and 74. The upper platform 74 is supported by struts 76 extending between the lower and upper platforms 72 and 74 and is divided into plate-like sections 74A, 74B, and build platform 16' by slots 78 extending therethrough. It should be appreciated that the upper platform 74 may be formed of only the build platform 16'. As illustrated, each plate-like section 74A, 74B, and build platform 16' are individually supported by struts 76. It should be appreciated that while the struts 76 are illustrated as a fixed length strut, an actuator may be used in place of the fixed length strut to permit vertical movement of the upper platform sections.

The build chamber 14' includes inner and outer side walls 28' and 30' that define a build chamber opening 32'. As illustrated, the inner and outer side walls 28' and 30' extend upwardly relative to the turntable 12' and are parallel to each other to form a ring 31' to allow continuous manufacturing. As illustrated, the inner and outer side walls 28' and 30' extend perpendicular to the turntable 12', it should be appreciated that the inner and outer side walls 28' and 30' may extend upwardly at angles other than ninety degrees. As depicted in FIG. 4, the inner and outer side walls 28' and 30' define a path in the form of ring 31'; however, it should be appreciated that the inner and outer side walls 28' and 30' may define paths in other forms such as straight lines, curves, or polygons to permit the manufacture of various shaped parts.

The ring 31' is connected to end mounts of actuators 34' for vertical up or down movement relative to the lower platform 72 of the turntable 12'. The inner and outer walls 28' and 30' of the ring 31' are positioned in respective slots 78 to allow the ring 31' to move vertically between upper platform sections 74A, 74B, and build platform 16'. As illustrated, the ring 31' surrounds build platform 16' to form the build chamber 14'. The actuator 34' is depicted schematically in FIG. 1.

As discussed above, the build platform 16' is bounded by slots 78 extending through the upper platform 74. The build platform 16' is a plate-like structure that is fixedly secured to the lower platform 72 by struts 76. The build platform 16' extends into the build chamber 14' below the build chamber opening 32' and extends an entire length of the build chamber 14'. In addition to build platform 16', upper platform sections 74A and 74B provide additional centering support to the ring 31' while the turntable 12' is rotating and moving up or down.

For purposes of clarity, the primary build process will be described using additive manufacturing apparatus 10. Differences between additive manufacturing apparatuses 10 and 10' will be delineated, where appropriate, throughout the build process description.

The build process for a part using the additive manufacturing apparatus 10 described above is as follows. The fusing unit 20 is prepared by filling the powder supply 44 with powder P. The fusing unit 20 is positioned such that seal 38 of housing 18 engages the inner and outer side walls 28 and 30. It should be appreciated that positioning the fusing unit 20 may be accomplished by using actuator 40 to lower the fusing unit 20 and/or by using actuator 24 to raise the turntable 12. In regards to additive manufacturing unit 10', the ring 31' may be raised using actuators 34' instead of raising turntable 12'.

Once the fusing unit 20 is positioned, the build platform 16 is moved to an initial high position by actuator 34. For additive manufacturing apparatus 10', the ring 31' is lowered until the build platform 16' is at the initial high position. Housing 18 and fusing unit 20 would also be lowered to maintain engagement between seal 38 and inner and outer side walls 28' and 30'. The initial high position is located below upper surfaces 80 and 82 of the inner and outer side walls 28 and 30, respectively and which define the build chamber opening 32, by a selected layer increment. The layer increment affects the speed of the additive manufacturing process and the resolution of the part. As an example, the layer increment may be about 10 to 50 micrometers (0.0004 to 0.002 in.). The turntable 12 is then rotated by motor 22 at a pre-determined rotational speed selected to permit the fusing unit 20 to melt or fuse powder being dropped onto the build platform 16 to form a part, see FIG. 5. It should be appreciated that more than one housing 18 and fusing unit 20 may be used. As illustrated in FIG. 6, fusing units 20 may be dispersed around the ring 31 to speed up and provide a more efficient build process. It should also be appreciated that the fusing unit may be moved along the inner and outer side walls 28 and 30 instead of rotating the turntable 12.

With the turntable 12 rotating, powder "P" is then deposited over the build platform 16. The applicator 42 is moved across the build platform 16 to spread the raised powder P horizontally over the build platform 16. Any excess powder P is pushed along the build platform 16 as the turntable 12 rotates to provide a continuous powder deposition and spreading.

As the powder is deposited and spread onto the rotating build platform 16, the directed energy source 46 is used to melt a two-dimensional cross-section or layer of the part being built. The directed energy source 46 emits a beam "B" and the beam steering apparatus 48 is used to steer the focal spot of the beam B over the exposed powder surface in an appropriate pattern. The exposed layer of the powder P is heated by the beam B to a temperature allowing it to melt, flow, and consolidate. This step may be referred to as fusing the powder P.

Once the first layer increment of powder P is fused, the build platform 16 is moved vertically downward by the layer increment, and another layer of powder P is applied in a similar thickness, see FIG. 7. In the case of additive manufacturing apparatus 10', the ring 31' is raised to allow another layer of powder P to be applied. The directed energy source 46 continues to emit a beam B and the beam steering apparatus 48 is used to steer the focal spot of the beam B over the exposed powder surface in an appropriate pattern. The exposed layer of the powder P is heated by the beam B to a temperature allowing it to melt, flow, and consolidate both within the top layer and with the lower, previously-solidified layer. It should be appreciated that the process of depositing powder P and using the directed energy source 46 to fuse the powder can be continuous as the part is being formed, with the process only being stopped when the part is completed or when a defect or malfunction is detected. It should also be appreciated that when multiple fusing units 20 are employed that each unit may be used to form a single increment layer or to form multiple increment layers.

This cycle of moving the build platform 16, applying powder P, and then directed energy melting the powder P is repeated until the entire part is complete. It is also noted that the vertical movement of build platform 16 or ring 31' may be continuous during the build process, so that the part builds continuously in a spiral configuration.

Once the part is complete, the vacuum pump 52 may be used to remove unused powder from the build chamber 14. The turntable 12 may then be lowered and the housing 18 and fusing unit 20 raised to disengage the inner and outer side walls 28 and 30 from the seal 38. The build platform 16 is then raised by actuator 34 to expose the part above the inner and outer sidewalls 28 and 30. In the case of additive manufacturing apparatus 10', the housing 18 and fusing unit 20 are raised and the ring 31' is lowered to expose the part above the inner and outer sidewalls 28' and 30'.

An alternative additive manufacturing apparatus is illustrated in FIGS. 8-11 and shown generally at reference numeral 100. The basic components are a turntable 112, a build chamber 114, a housing 118, a fusing unit 120 housed in the housing 118, and a powder unit 184. Each of these components will be described in more detail below.

The turntable 112 is a plate-like rigid structure configured to move vertically in the z-axis as well as rotate three hundred and sixty degrees. Unlike additive manufacturing apparatus 10, the turntable 112 acts as the build platform. As illustrated, the turntable 112 is secured to an end mount of a motor 122 that is operable to selectively rotate the turntable 112 and the motor 122 is secured to an end mount of an actuator 124 that is operable to selectively move the turntable 112 vertically up or down. The actuator 124 is secured to a support structure 126. The actuator 124 is depicted schematically in FIG. 8, as is the motor 122.

Figure 8:
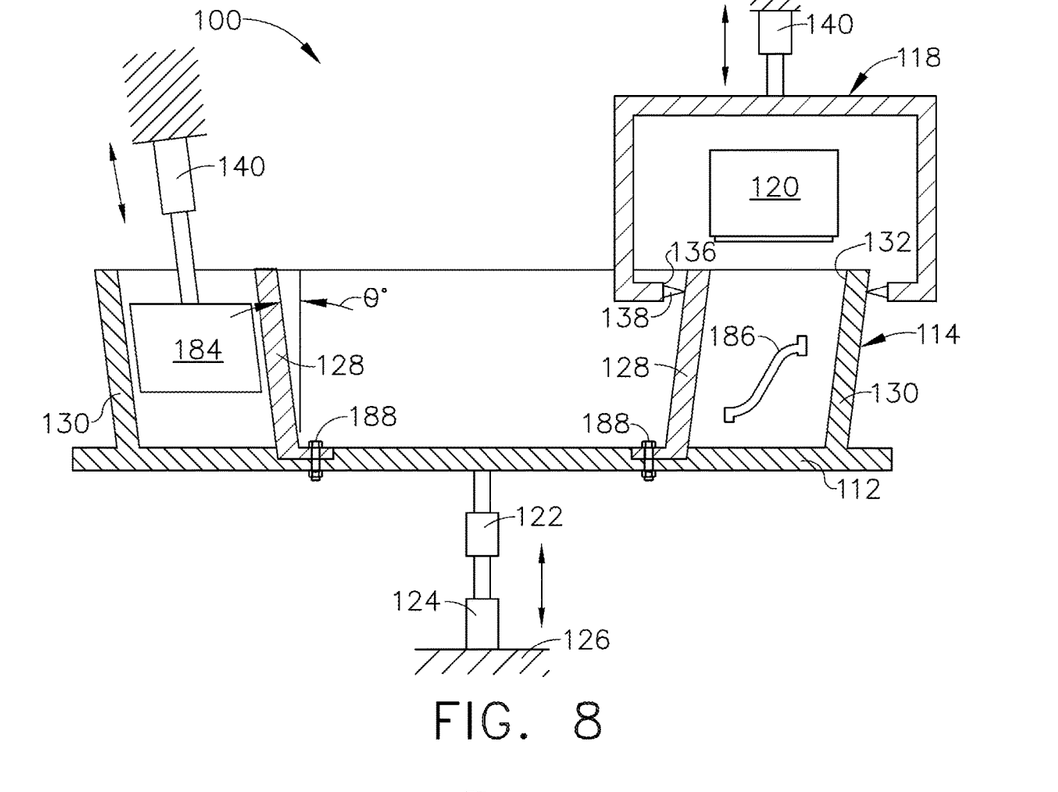
FIG. 8 is a cross-sectional view of another alternative additive manufacturing apparatus.
Figure 9:
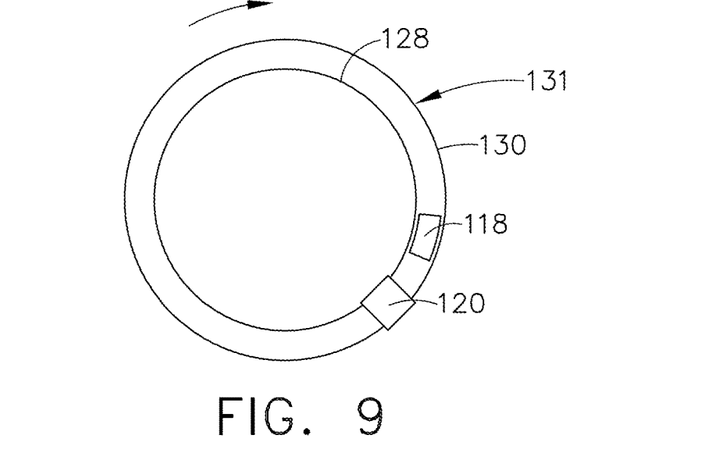
FIG. 9 is a top plan view of the apparatus of FIG. 8.
Figure 10:
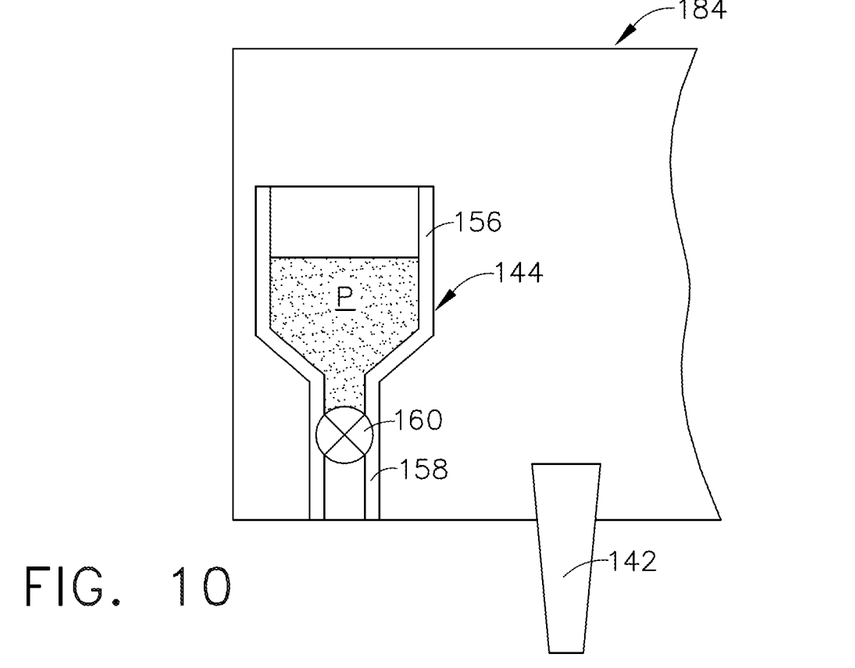
FIG. 10 is a schematic sectional view of a powder unit of FIG. 8.

The build chamber 114 includes inner and outer side walls 128 and 130 that define a build chamber opening 132. As illustrated, the inner and outer side walls 128 and 130 are parallel to each other and extend upwardly from the turntable 112 at a pre-determined angle to form a ring 131, see FIG. 9, to allow continuous manufacturing. One or both of the side walls 128 and 130 extend at a non-perpendicular angle to the turntable 112 and be referred to as "angled." One or both of the side walls 128 and 130 may be non-planar, and optionally they may be non-parallel to each other. The inner side wall 128 is releasably secured to the turntable 112 to allow the inner side wall 128 to be removed from the turntable 112. This arrangement allows a part 186 to be easily removed from the build chamber 114 when the build process has finished. As illustrated, the inner side wall 128 is secured to the turntable 112 by fasteners 188; however, it should be appreciated that other suitable connection types may be used. As depicted in FIG. 9, the inner and outer side walls 128 and 130 define a path in the form of ring 131; however, it should be appreciated that the inner and outer side walls 128 and 130 may define paths in other forms such as straight lines, curves, or polygons to permit the manufacture of various shaped parts.

The angled side walls 128 and 130 of the build chamber 114 permit the construction of parts 186 with a tapered cross-section while reducing the amount of powder P needed to produce the part 186.

The powder unit 184, another example of a build unit, is secured to an end mount of an actuator 190 that is operable to selectively move the powder unit 184 up and down. As illustrated, the powder unit is configured to move up and down within the build chamber 114 to deposit and scrape powder P deposited in the build chamber 114. As detailed in FIG. 10, the powder unit 184 includes an applicator 142 and a powder dispenser 144. The applicator 142 is a rigid, laterally-elongated structure that, when used, scrapes along the build platform to provide a layer increment of powder thereon between inner and outer side walls 128 and 130. The powder dispenser 144 comprises a supply container 156 in the form of a hopper having a spout 158 for dropping powder P onto the build platform. A metering valve 160 is positioned in the spout 158.

The housing 118 includes an opening 136 configured to receive at least a portion of the build chamber 114 therein and to permit the fusing unit 120 to build a part. A seal 138 is disposed around the opening 136 to provide sealing engagement between the opening 136 and the inner and outer side walls 128 and 130 of the build chamber 114. The seal 138 prevents contaminants from interfering with the build process, centers the housing 118 with the build chamber 114, and permits the housing 118 to slide along the inner and outer side walls 128 and 130 as the turntable 112 rotates with minimal interference. The housing 118 is secured to an end mount of an actuator 140 that is operable to selectively move the housing up or down during a build process to maintain a pre-determined distance between the fusing unit 120 and a part being built. The actuator 140 also allows the housing to be removed from engagement with the inner and outer side walls 128 and 130. The actuator 140 is depicted schematically in FIG. 8.

Figure 11:
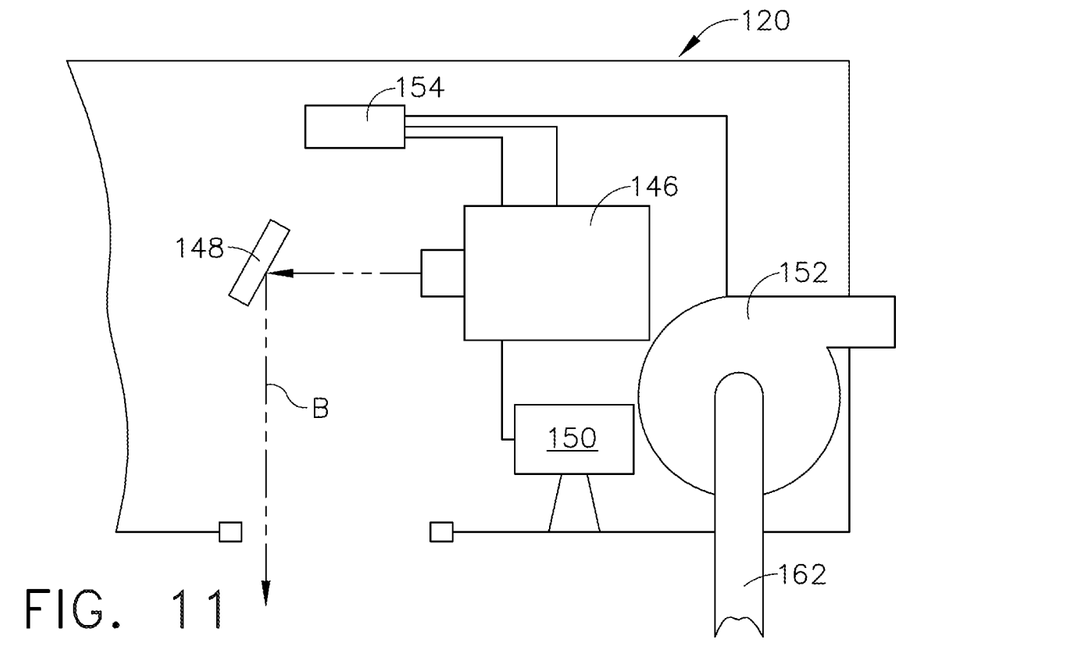
FIG. 11 is a schematic sectional view of a fusing unit of FIG. 8.

As illustrated in FIG. 11, the fusing unit 120, another example of a build unit, includes a directed energy source 146, a beam steering apparatus 148, an imaging device 150, a vacuum pump 152, and a controller 154.

The directed energy source 146 may comprise any known device operable to generate a beam of suitable power and other operating characteristics to melt and fuse the powder during the build process, described in more detail below. For example, the directed energy source 146 may be a laser. Other directed-energy sources such as electron beam guns are suitable alternatives to a laser.

The beam steering apparatus 148 comprises one or more mirrors, prisms, and/or lenses and provided with suitable actuators, and arranged so that a beam "B" from the directed energy source 146 can be focused to a desired spot size and steered to a desired position in an X-Y plane coincident with the build platform.

The vacuum pump 152 includes a nozzle 162 configured to extend into the build chamber 114. The vacuum pump 152 may be used to remove excess powder after the applicator 142 has leveled powder and before fusing takes place.

The imaging device 150 may be used for quality control as described above. The imaging device 150 The controller 154 controls the directed energy source 146, the beam steering apparatus 148, and the vacuum pump 152 of the fusing unit 120. The imaging device 150 may also be connected to the controller 154 to provide means for process control and/or automated quality control as described above.

The build process for a part 186 begins by filling the powder dispenser 144 with powder P. The fusing unit 120 is positioned such that seal 138 of housing 118 engages the inner and outer side walls 128 and 130. It should be appreciated that positioning the fusing unit 120 may be accomplished by using actuator 140 to lower the fusing unit 120 and/or by using actuator 124 to raise the turntable 112.

Once the fusing unit 120 is positioned, the powder unit 184 is lowered to an initial low position by actuator 190. The initial low position is located above the turntable 112 (build platform) by a selected layer increment. The layer increment affects the speed of the additive manufacturing process and the resolution of the part. As an example, the layer increment may be about 10 to 50 micrometers (0.0004 to 0.002 in.). The turntable 112 is then rotated by motor 122 at a pre-determined rotational speed selected to permit the fusing unit 120 to melt or fuse powder being dropped onto the build platform to form part 186. It should be appreciated that more than one housing 18 and fusing unit 20 may be used. As illustrated in FIG. 9, the fusing unit 120 and powder unit 184 are positioned along the ring 131 such that the powder unit 184 is in a first position and the fusing unit 120 is in a second position.

With the turntable 112 rotating, powder "P" is then deposited over the build platform. The applicator 142 is moved across the build platform to spread the raised powder P horizontally over the build platform. Any excess powder P is pushed along the build platform as the turntable 112 rotates to provide a continuous powder deposition and spreading.

As the powder is deposited and spread onto the rotating build platform, the directed energy source 146 is used to melt a two-dimensional cross-section or layer of the part being built. The directed energy source 146 emits a beam "B" and the beam steering apparatus 148 is used to steer the focal spot of the beam B over the exposed powder surface in an appropriate pattern. The exposed layer of the powder P is heated by the beam B to a temperature allowing it to melt, flow, and consolidate. This step may be referred to as fusing the powder P.

Once the first layer increment of powder P is fused, the powder unit 184 is moved upwardly by the layer increment, and another layer of powder P is applied in a similar thickness like that discussed in FIG. 7. The directed energy source 146 continues to emit a beam B and the beam steering apparatus 148 is used to steer the focal spot of the beam B over the exposed powder surface in an appropriate pattern. The exposed layer of the powder P is heated by the beam B to a temperature allowing it to melt, flow, and consolidate both within the top layer and with the lower, previously-solidified layer. It should be appreciated that the process of depositing powder P and using the directed energy source 146 to fuse the powder is continuous as the part is being formed. This process is only stopped when the part is completed or when a defect or malfunction is detected.

This cycle of moving the powder unit 184, applying powder P, and then directed energy melting the powder P is repeated until the entire part is complete. It is also noted that the vertical movement of the powder unit 184 may be continuous during the build process, so that the part builds continuously in a spiral configuration.

Once the part is complete, the vacuum 152 removes any unused powder from the build chamber 114. The turntable 112 may then be lowered and the housing 118 and fusing unit 120 raised to disengage the inner and outer side walls 128 and 130 from the seal 138. The powder unit 184 is also raised out of the build chamber 114. The inner side wall 128 may then be removed to expose the part 186 for removal.

An alternative additive manufacturing apparatus is illustrated in FIGS. 12-15 and shown generally at reference numeral 200. The basic components are a turntable 212, a build chamber 214 surrounding a build platform 216, a housing 218, and a fusing unit 220 disposed in the housing 218. Each of these components will be described in more detail below.

Figure 12:
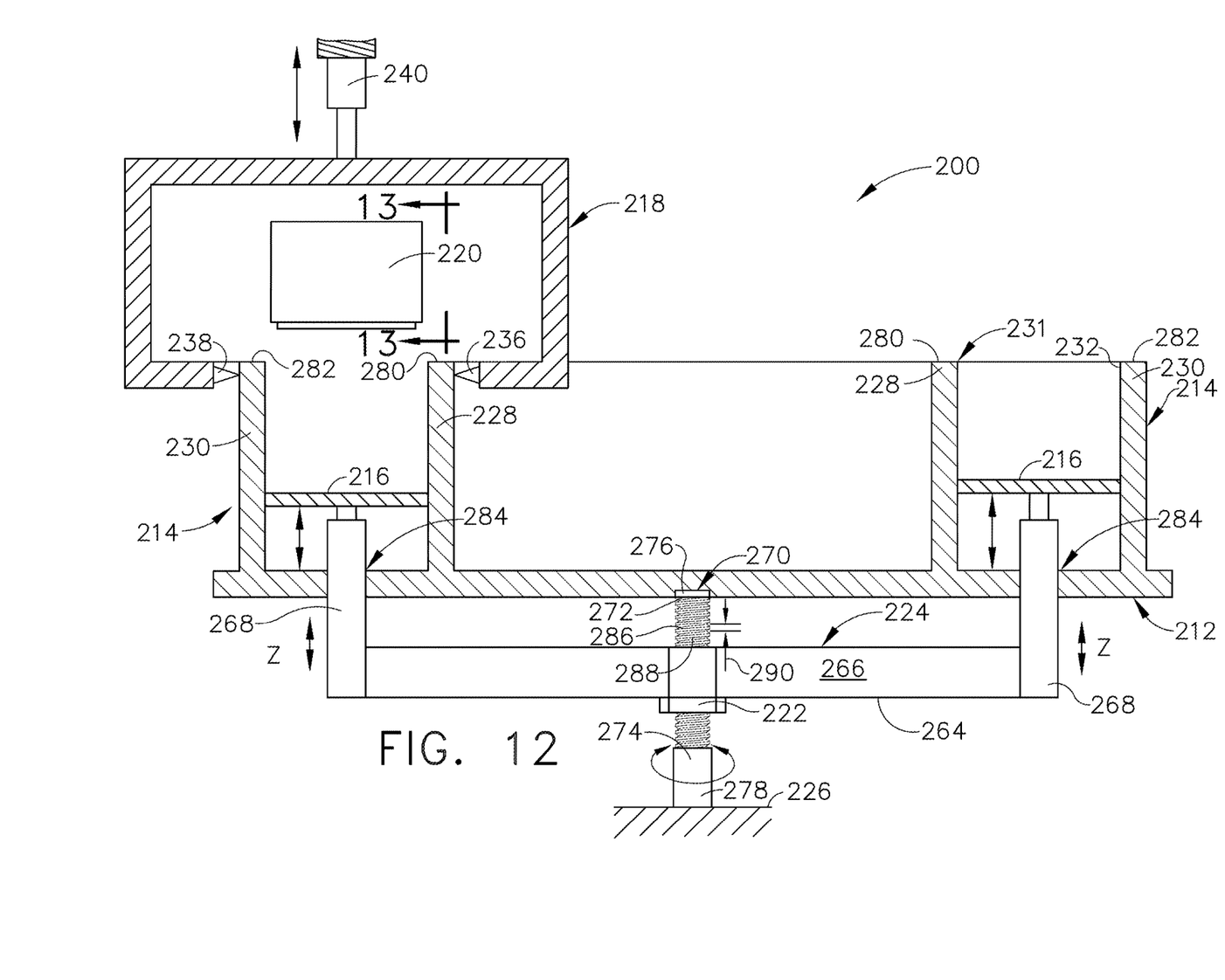
FIG. 12 is a cross-sectional view of another alternative additive manufacturing apparatus.

The turntable 212 is a rigid structure configured to rotate 360° about a pivot 270. As illustrated, the turntable 212 is connected at the pivot 270 to a first end 272 of a screw mount 274. The connection at the pivot 270 may be by any suitable means to permit the turntable 212 to rotate relative to the screw mount 274, for example, a bearing 276 may be used to connect the turntable 212 to the screw mount 274 at the pivot 270. A second end 278 of the screw mount 274 is mounted to a stationary support structure 226.

An actuator assembly 224 is rotatably mounted to the screw mount 274. The actuator assembly 224 includes a motor 222 and a support frame 264, the motor 222 being configured to selectively rotate the support frame 264 about the screw mount 274. As illustrated, the support frame 274 includes two vertical supports 268 (e.g. posts) connected to a horizontal support 266; however, it should be appreciated that the support frame 264 may include additional horizontal and vertical supports or may be of a different configuration to allow the support frame 264 to adequately support the build platform 216.

As shown, each vertical support 268 extends through an aperture 284 in the turntable 212 into the build chamber 214 to support the build platform 216 and rotate the turntable 212 about the pivot 270. The screw mount 274 includes a continuous thread 286 that spirals around a shank 288 of the screw mount 274. As shown, the thread 286 has a pre-determined pitch 290. By increasing or decreasing the pitch 290, the feed rate of the screw mount 274 along the Z axis may be changed. In operation, when the motor 222 rotates the support frame 264 about the screw mount 274, the support frame 264 rotates the turntable 212 at a controlled rotational speed provided by the motor 222 and moves the build platform 216 up or down the Z axis at a controlled feed rate.

The build chamber 214 includes inner and outer side walls 228 and 230 that define a build chamber opening 232. As illustrated, the inner and outer side walls 228 and 230 extend perpendicularly upward from the turntable 212 to define a path in the form of a ring 231, see FIG. 14, and may be integrally formed with the turntable 212. As discussed above, it should be appreciated that the inner and outer side walls 228 and 230 may extend upwardly from the turntable 212 at angles other than ninety degrees.

The build platform 216 is a plate-like structure that is vertically slidable in the build chamber 214 below build chamber opening 232. The build platform 216 extends around an entire perimeter of the build chamber 214 and is secured to vertical supports 268 of the actuator assembly 224 which is operable to selectively move the build platform 216 up or down as the turntable 212 rotates.

Figure 17:
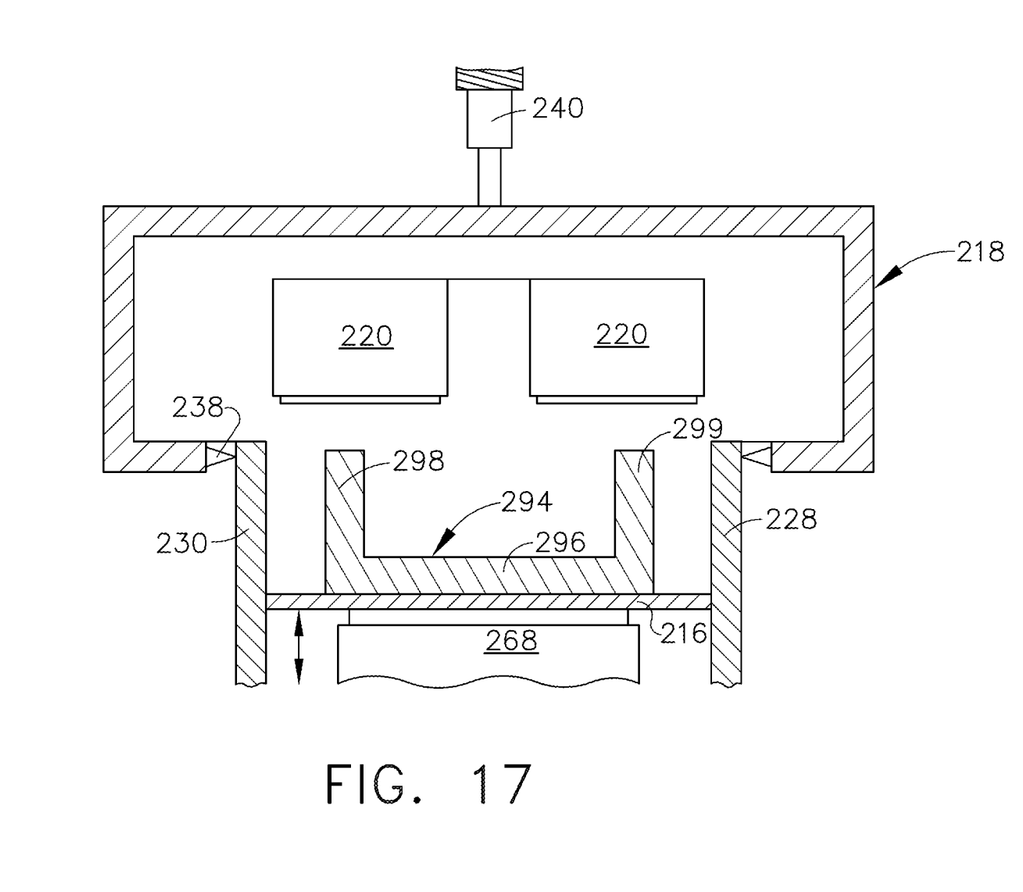
FIG. 17 is a cross-sectional view of a portion of the additive manufacturing apparatus of FIG. 12 incorporating a housing having multiple build units therein.

The housing 218 includes an opening 236 configured to receive at least a portion of the build chamber 214 therein and to permit the fusing unit 220 to build a part. As shown in FIG. 17, the housing 218 may optionally include multiple fusing units 220 to allow each fusing unit 220 to build a portion of the part, as explained in detail below. A seal 238 is disposed around the opening 236 to provide sealing engagement between the opening 236 and the inner and outer side walls 228 and 230 of the build chamber 214. The seal 238 prevents contaminants from interfering with the build process, centers the housing 218 with the build chamber 214, and permits the housing 218 to slide along the inner and outer side walls 228 and 230 as the turntable 212 rotates with minimal interference. The housing 218 is secured to an end mount of an actuator 240 that is operable to selectively move the housing 218 up or down during a build process to maintain a pre-determined distance between the fusing unit 220 and a part being built. The actuator 240 also allows the housing to be removed from engagement with the inner and outer side walls 228 and 230. The actuator 240 is depicted schematically in FIG. 12.

Figure 13:
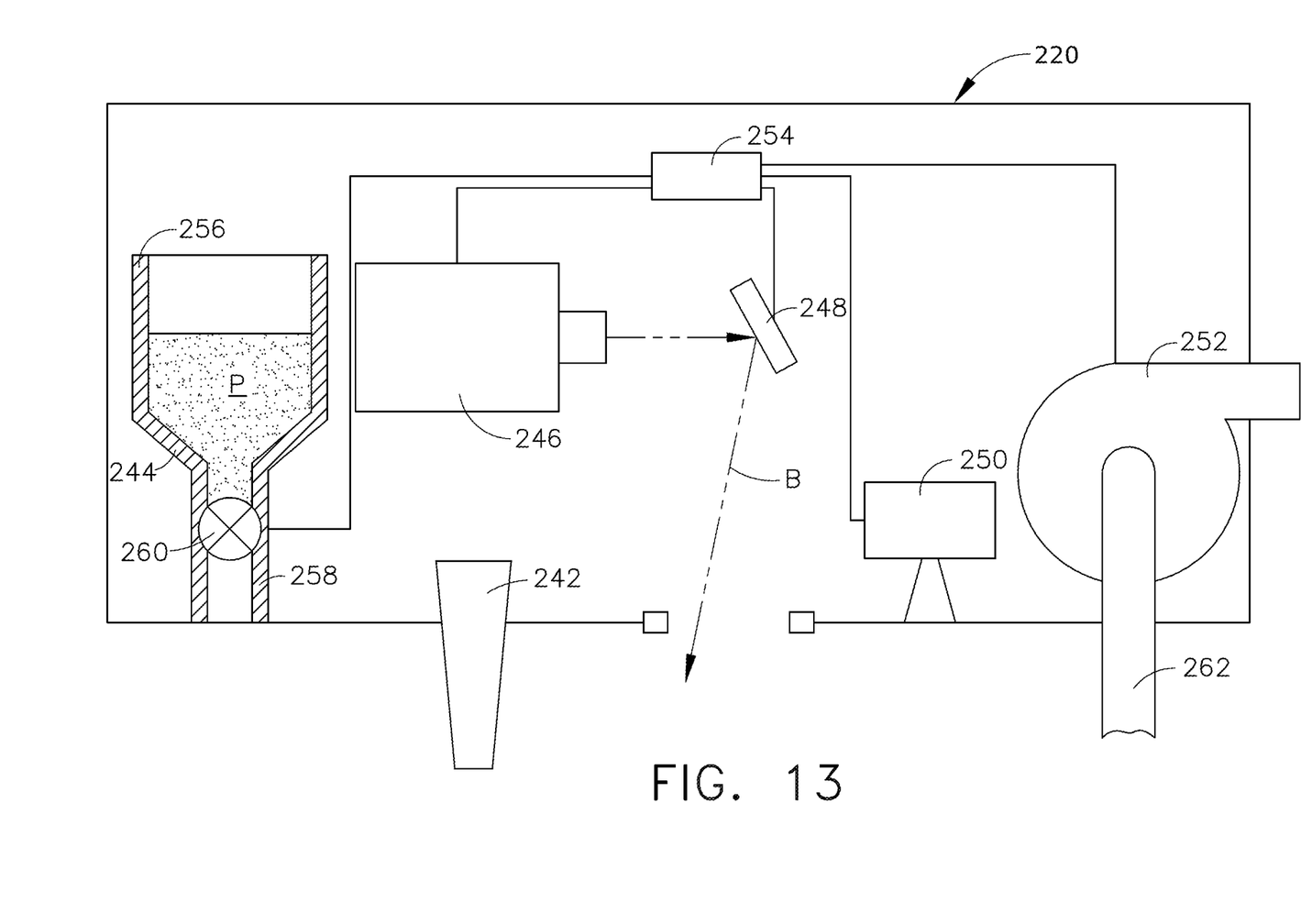
FIG. 13 is a schematic sectional view of a fusing unit of FIG. 12.

As illustrated in FIG. 13, the fusing unit 220 includes an applicator 242, a powder dispenser 244, a directed energy source 246, a beam steering apparatus 248, an imaging device 250, a vacuum pump 252, and a controller 254. The fusing unit 220 is one example of a "build unit" which refers generally to any unit positioned over the build chamber 214 and configured to perform one or more steps of an additive build process. Other types of build units are described below.

Figure 15:
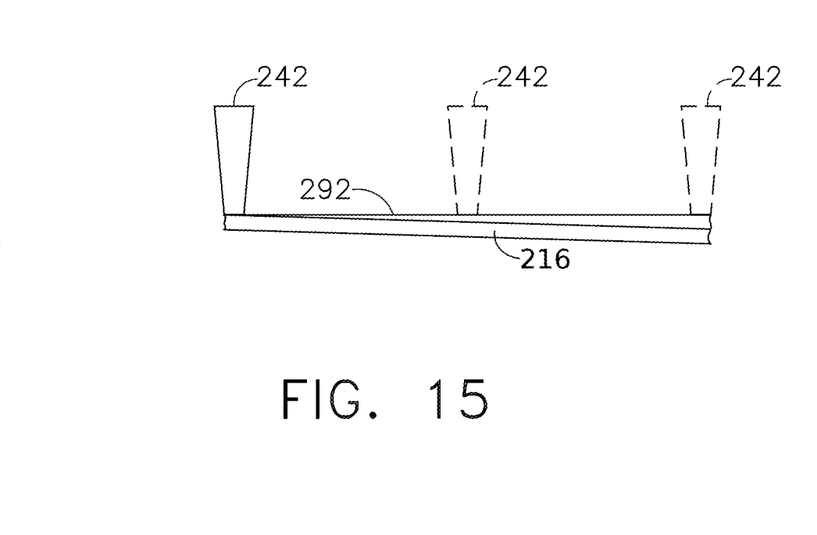
FIG. 15 is a schematic view showing a beginning of a build process.

The applicator 242 is a rigid, laterally-elongated structure that, when used, scrapes along at a fixed distance above the build platform 216 to provide a layer increment of powder thereon between inner and outer side walls 228 and 230, see FIG. 15.

The powder dispenser 244 comprises a supply container 256 in the form of a hopper having a spout 258 for dropping powder P onto the build platform 216. A metering valve 260 is positioned in the spout 258. In use, the metering valve 260 is used to control the deposition rate of powder P based on multiple factors such as the size of the build platform 216, a desired layer increment thickness, and the relative speed between the build platform 216 and the fusing unit 220.

The directed energy source 246 may comprise any known device operable to generate a beam of suitable power and other operating characteristics to melt and fuse the powder during the build process, described in more detail below. For example, the directed energy source 246 may be a laser. Other directed-energy sources such as electron beam guns are suitable alternatives to a laser.

The beam steering apparatus 248 comprises one or more mirrors, prisms, and/or lenses and provided with suitable actuators, and arranged so that a beam "B" from the directed energy source 246 can be focused to a desired spot size and steered to a desired position in an X-Y plane coincident with the build platform 216.

The vacuum pump 252 includes a nozzle 262 configured to extend into the build chamber 214. The vacuum pump 252 may be used to remove excess powder after the applicator 242 has leveled powder and before fusing takes place.

The imaging device 250 may be any apparatus that provides a signal or data indicative of the surface condition within the build chamber 214, such as camera or other sensor operating in the visible, IR, and/or UV spectrum. The imaging device 250 allows a user to monitor the build process and modify the operating parameters of the fusing unit 220 and/or shut the build process down when the user detects a defect or malfunction in the build process. The imaging device 250 may also be connected to the controller 254 to provide an automated quality control process. The controller 254 controls the directed energy source 246, the beam steering apparatus 248, the powder dispenser 244, and the vacuum pump 252 of the fusing unit 220. The imaging device 250 provides the controller 254 with signals representative of the condition of the build process. For example, the controller 254 may use data from the imaging device 250 to control powder flow rate and/or to stop the build process upon detection of a defect.

The build process for a part using the additive manufacturing apparatus 200 described above is as follows. The fusing unit 220 is prepared by filling the powder supply 244 with powder P. The fusing unit 220 is positioned such that seal 238 of housing 218 engages the inner and outer side walls 228 and 230. It should be appreciated that positioning the fusing unit 220 may be accomplished by using actuator 240 to lower the fusing unit 220.

Once the fusing unit 220 is positioned, the build platform 216 is moved to an initial high position by actuator assembly 224. The initial high position is located below upper surfaces 280 and 282 of the inner and outer side walls 228 and 230, respectively by a minimal amount to prevent collision between the applicator 242 and the build platform 216. Housing 218 and fusing unit 220 would also be lowered to maintain engagement between seal 238 and inner and outer side walls 228 and 230 and to position the applicator 242 at the desired position, FIG. 15. The turntable 212 is then rotated by actuator assembly 224 at a pre-determined rotational speed selected to be within the capability of the fusing unit 220 to melt or fuse the powder.

Figure 16:
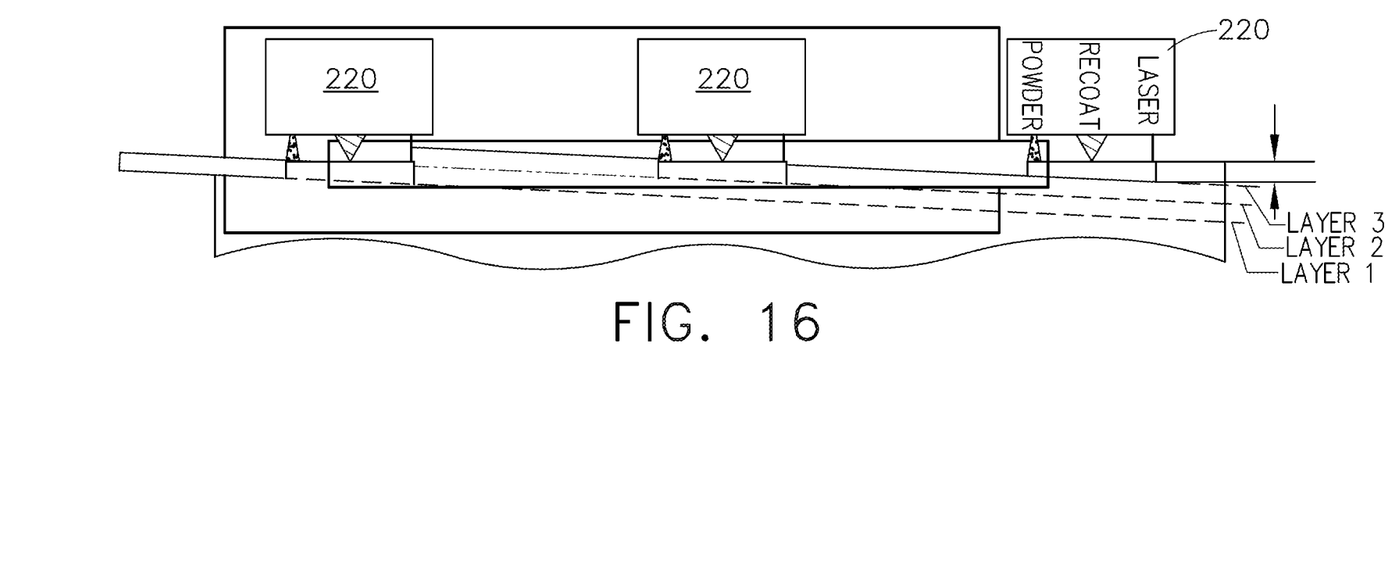
FIG. 16 is a schematic showing a continuous build process, layer-by-layer, in a spiral configuration.

With the turntable 212 rotating, powder "P" is then deposited over the build platform 216. The applicator 242 is moved across the build platform 216 to spread the raised powder P horizontally over the build platform 216. Any excess powder P is pushed along the build platform 216 as the turntable 212 rotates to provide a continuous powder deposition and spreading. As shown in FIG. 15, by starting the build process with the applicator 242 at a position relative to the build platform 216 that is less than the selected layer increment, a ramp 292 is formed to allow the part to be built in a spiral build process. As illustrated, once the ramp 292 is formed, the downward movement of the build platform 216 allows the selected layer of increment to be deposited from that point on as shown in FIG. 16. The layer increment affects the speed of the additive manufacturing process and the resolution of the part. As an example, the layer increment may be about 10 to 50 micrometers (0.0004 to 0.002 in.).

As the powder is deposited and spread onto the rotating build platform 216, the directed energy source 246 is used to melt a two-dimensional cross-section or layer of the part being built. The directed energy source 246 emits a beam "B" and the beam steering apparatus 248 is used to steer the focal spot of the beam B over the exposed powder surface in an appropriate pattern. The exposed layer of the powder P is heated by the beam B to a temperature allowing it to melt, flow, and consolidate. This step may be referred to as fusing the powder P.

Figure 14:
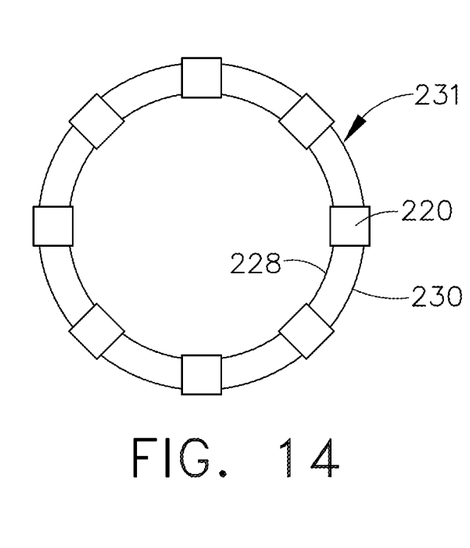
FIG. 14 is a top plan view of an alternative arrangement of the apparatus of FIG. 12.

As discussed above, the first layer increment of powder begins with ramp 292 that builds up to a thickness equal to the desired layer increment of powder to allow a continuous build process. This continuous build process is permitted by the spiral movement created by screw mount 274 and actuator assembly 224. The feed rate provided by the screw mount 274 allows the build platform 216 to lower in the Z axis at a constant rate, thereby allowing a constant layer increment of powder to be deposited, scraped, and fused, FIG. 16. The process of depositing powder P and using the directed energy source 246 to fuse the powder is continuous as the part is being formed in a spiral configuration, with the process only being stopped when the part is completed or when a defect or malfunction is detected. It should be appreciated that more than one housing 218 and fusing unit 220 may be used. As illustrated in FIG. 14, fusing units 220 may be dispersed around the ring 231 to speed up and provide a more efficient build process. As shown in FIG. 16, when multiple fusing units 220 are used they may be used to deposit and fuse multiple overlapping layers (e.g. "layer 1", "layer 2", "layer 3") in a spiral configuration, similar to a multi-lead screw form. This configuration is more efficient and less problematic than attempting to use multiple fusing units 220 for a single layer. It should also be appreciated that the fusing unit may be moved along the inner and outer side walls 228 and 230 instead of rotating the turntable 212.

The vacuum pump 252 may be used to remove unused powder from the build chamber 214. The housing 218 and fusing unit 220 are raised to disengage the inner and outer side walls 228 and 230 from the seal 238. The build platform 216 is then raised by actuator assembly 224 to expose the part above the inner and outer sidewalls 228 and 230.

As discussed above, the housing 218 may include multiple fusing units to increase the efficiency of the build process. As shown in FIG. 17, illustrates the housing 218 includes two fusing units 220. The use of two or more fusing units 220 allows each fusing unit 220 to build a portion of a part. In the illustrated example, a part 294 having a base section 296, a first wall section 298 and a second wall section 299 is being built on build platform 216. In building the part 294, the base section 296 is built first using one of the fusing units 220, for example, the fusing unit on the left. Once the base section 296 has been built, the first and second wall sections 298 and 299 are built. The fusing unit 220 on the left builds the first wall section 298 and the fusing unit 220 on the right builds the second wall section 299. By using multiple fusing units 220, the first and second wall sections 298 and 299 may be built at the same time and with minimal movement of the directed energy source 246 of each fusing unit 220, thereby increasing efficiency and shortening the build time.

Figure 18:
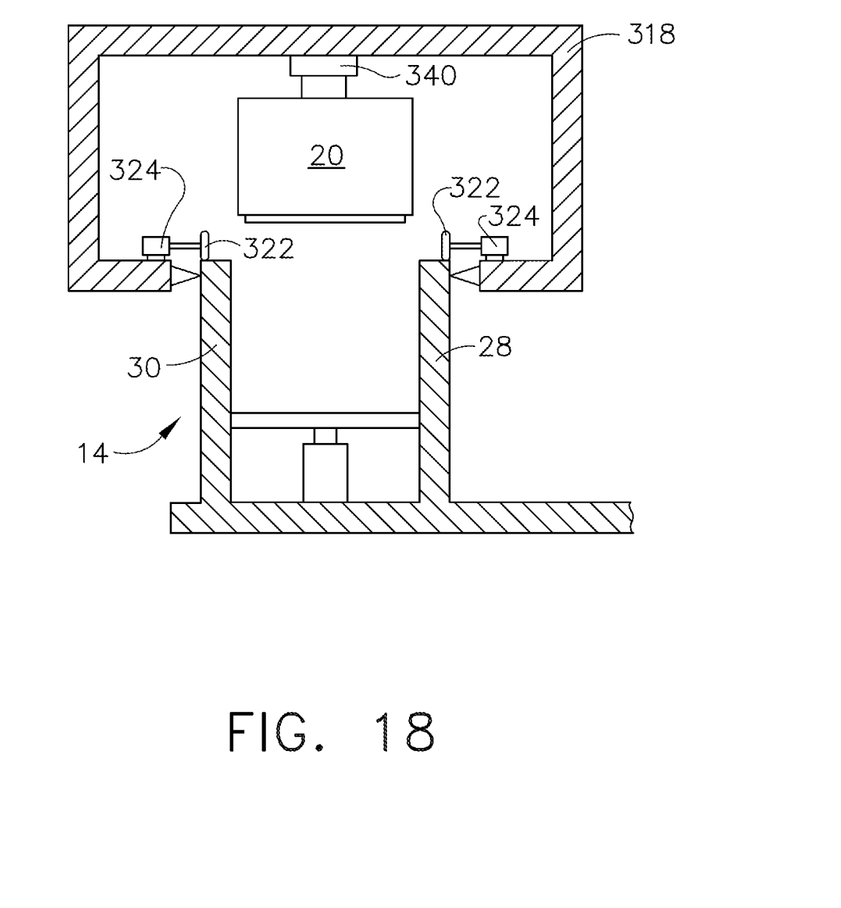
FIG. 18 is a cross-sectional view of a portion of an additive manufacturing apparatus incorporating a build unit having an alternative drive system.

The build units described above have been described as being supported by actuators which are used to position and move the build units relative to the respective build chambers. As an alternative, any of the build units described above may be provided with drive means for enabling movement relative to the build chamber without the use of an external actuator. For example, FIG. 18 illustrates the fusing unit 20 of FIG. 1, supported in a housing 318 which is similar to the housing 18 in FIG. 1, using an actuator 340 that is operable to selectively move the fusing unit 20 up or down. The housing 318 is shown mounted over a portion of the build chamber 14 of FIG. 1. The housing 318 includes one or more rollers 322 that bear on the inner and outer side walls 28 and 30 of the build chamber 14. At least one of the rollers 322 is coupled to a motor 324. Operation of the motor 324 causes the roller 322 to drive the housing 318 along the perimeter of the build chamber 14 (e.g. into or out of the page as show in FIG. 18). Any mechanism which effects relative motion between the build unit and the build chamber may be substituted for the illustrated rollers 322 and 324, such as belts, gear racks, chains, linear actuators, etc.

The foregoing has described apparatus and methods for additive manufacture of large parts. All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

What is claimed is:

1. An additive manufacturing method, comprising:
    positioning one or more build units over a build chamber defined in an annular space between a ring-shaped inner side wall and a ring-shaped outer side wall, each of the one or more build units being housed in a housing, the build chamber having a moveable build platform disposed therein between the inner and outer side walls;
    moving the build chamber to define a spiral movement by rotating the build chamber about an axis while simultaneously translating the build platform along the axis;
    while moving the build chamber:
        maintaining the housing in sealing engagement with the inner and outer walls;
        using the one or more build units to deposit powder into the build chamber;
        using the one or more build units to direct a beam from a directed energy source to fuse the powder; and
    continuing the steps of depositing, directing, and moving to build up a part in a spiral configuration until the part is complete.

2. The method according to claim 1, wherein the one or more build units include an applicator configured to scrape powder deposited into the build chamber.

3. The method according to claim 2, further including the step of positioning the applicator at a position relative to the build platform that is less than a selected layer increment.

4. The method according to claim 3, further including the step of maintaining the position of the applicator as the build platform translates along the axis.

5. The method according to claim 4, further including the step of using two or more build units to fuse multiple overlapping layers in the spiral configuration as the build platform translates along the axis.

6. The method according to claim 1, wherein the one or more build units include a powder dispenser, an applicator, and a directed energy source.

7. The method according to claim 1, wherein first and second spaced-apart build units contained in a single housing are positioned over the build chamber, each of the first and second spaced-apart build units includes a directed energy source, wherein the first build unit builds a first section of a part and the second build unit builds a second section of the part.

8. The method according to claim 1, further comprising the step of evacuating the build chamber of loose powder when the part is complete.

9. An additive manufacturing method, comprising:
    providing an apparatus having:
        a ring-shaped inner side wall and a ring-shaped outer side wall defining a build chamber therebetween;
        one or more housings for movement along the inner and outer side walls, each of the housings including:
            two or more spaced-apart build units, each build unit having a directed energy source configured to fuse powder contained in the build chamber; and
        a moveable build platform disposed between the inner and outer side walls;
    moving the build chamber to define a spiral movement by rotating the build chamber about an axis while simultaneously translating the build platform along the axis, wherein while moving the build chamber maintaining the housing in sealing engagement with the inner and outer side walls;
    using a first one of the two or more build units to build a base section of the part; and
    after the base section of the part has been completed, using the two or more build units simultaneously, wherein each of the two or more build units is used to build a separate wall section extending from the base.

10. The method according to claim 9, wherein the apparatus is configured to use each of the two or more spaced-apart build units to build two or more sections of a part at the same time.

11. The method according to claim 9, further including an actuator assembly connected to the build platform, the actuator assembly being configured to rotate and move the build platform continuously along a build axis to provide a spiral movement and permit a part to be built continuously in a spiral configuration.

* * * * *